Jan. 4, 1949.    W. C. STARKEY    2,458,441
BI-DIRECTIONAL NO-BACK POWER TRANSMISSION
Filed July 2, 1945    2 Sheets-Sheet 1
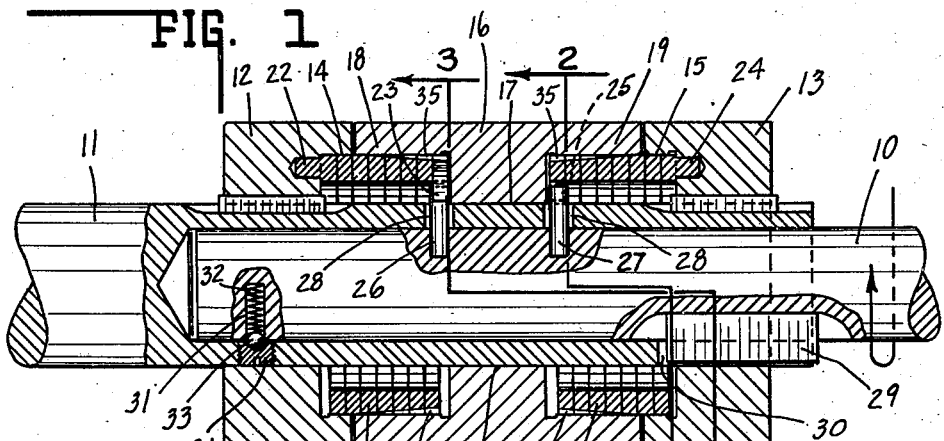
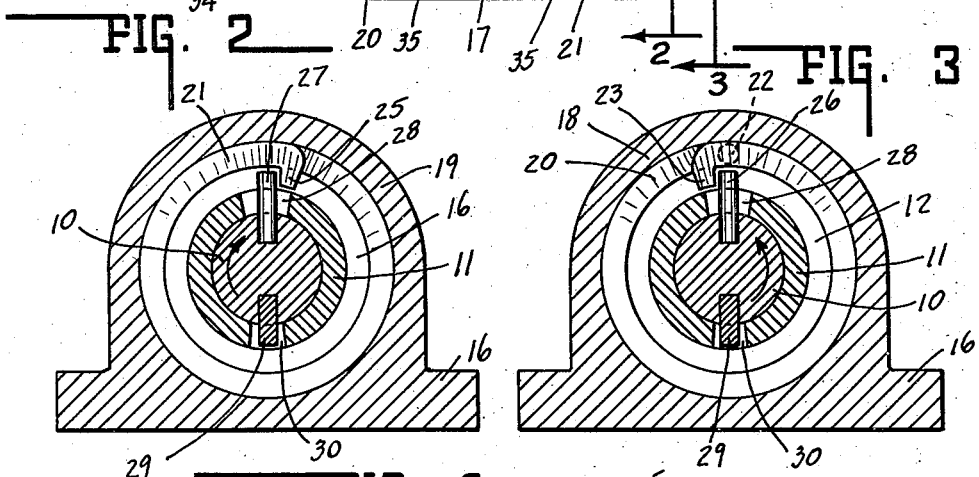
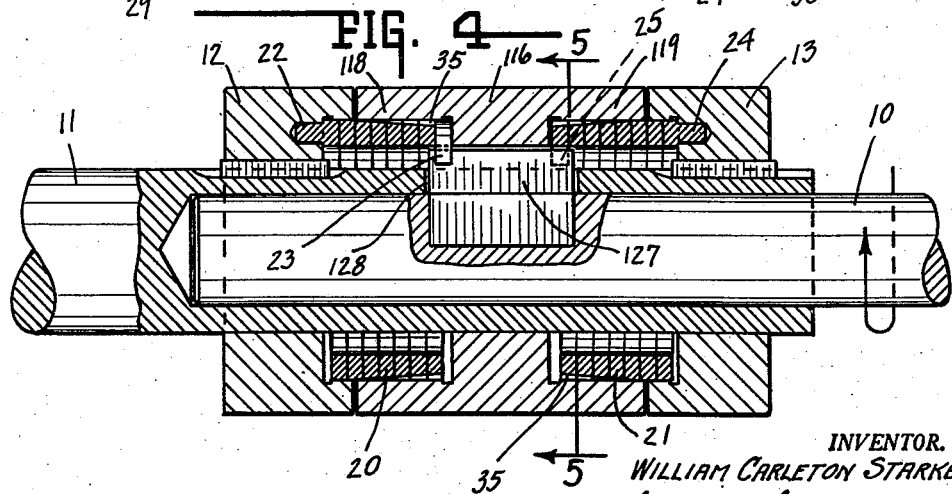
INVENTOR.
WILLIAM CARLETON STARKEY.
BY
Lockwood, Goldsmith & Galt,
ATTORNEYS.

Jan. 4, 1949.  W. C. STARKEY  2,458,441
BI-DIRECTIONAL NO-BACK POWER TRANSMISSION
Filed July 2, 1945  2 Sheets-Sheet 2
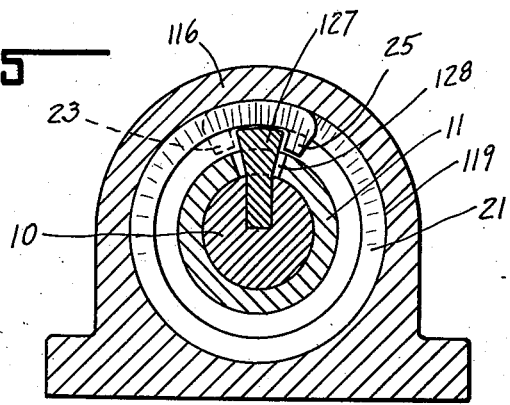
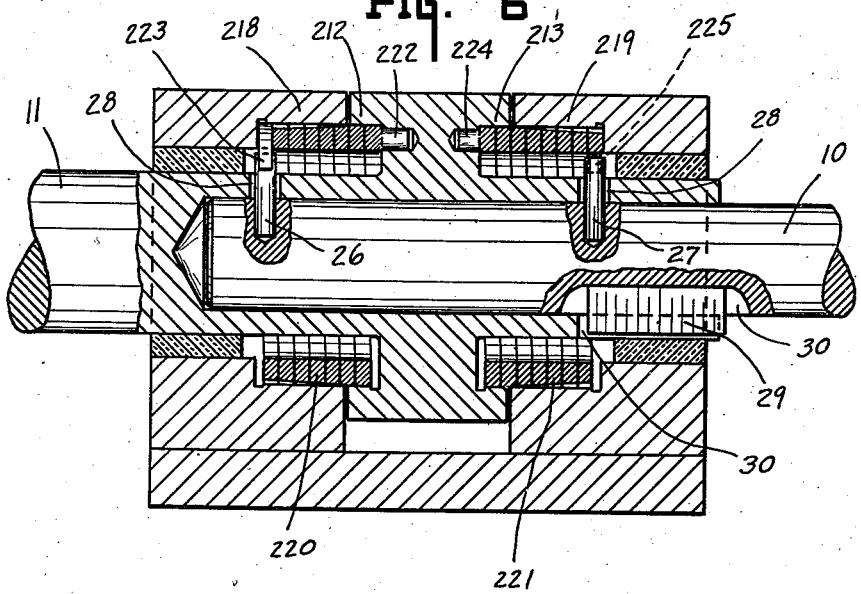
INVENTOR.
WILLIAM CARLETON STARKEY.
BY
Lockwood, Goldsmith & Galt
ATTORNEYS.

Patented Jan. 4, 1949

2,458,441

UNITED STATES PATENT OFFICE 2,458,441

BIDIRECTIONAL NO-BACK POWER TRANSMISSION

William Carleton Starkey, Indianapolis, Ind.

Application July 2, 1945, Serial No. 602,788

15 Claims. (Cl. 192—8)

This invention relates to a bi-directional no-back power transmission such as to permit a driving member to drive a driven member in either direction, but prevent the driven member from driving the driving member, reference being had to my application for Letters Patent, Serial No. 491,301, filed June 18, 1943, entitled "Anti-kickback clutch," now Patent No. 2,421,814, dated June 10, 1947.

Heretofore, in devices of this character, a single helical spring has been employed serving to be expanded into frictional locking engagement with a fixed pocket to lock the driven member against rotation when a torque load is applied thereto, while, on the other hand, upon the torque load being applied to the driving member it will first engage one or the other end portion of the spring to move it in a declutching direction whereby it is wrapped down out of frictional locking engagement with the fixed pocket to permit relative rotation of the driving and driven member. In such structures embodying the single clutch spring, there has been of necessity a certain free play or back lash when torque is applied to the driven member because it must rotate slightly before reengaging one or the other end of the spring to move it in a direction to expand it into frictional locking engagement with the fixed pocket.

It is the purpose of this invention to provide a bi-directional no-back power transmission, sometimes referred to as an "anti-kickback clutch," of such construction that the driven member will be prevented from having the slightest movement or back lash when torque load is applied thereto. It thereby becomes a positive and immediate lock against counter drive without any play in the reverse drive direction. This is accomplished by employing dual clutch springs, each having positive connection with the driven member and normally in positive locking engagement with the fixed or stationary pocket, whereby the driven member is at all times positively locked by both clutch springs against rotation when a torque load is applied thereto. Back lash or slight rotative movement of the driven member until such time as it acts to expand the spring into positive locking engagement with the fixed pocket, as heretofore, is thereby eliminated.

The full nature of the invention will be understood from the accompanying drawings and the following description and claims:

Fig. 1 is a central vertical section through the power transmission showing the driving member in elevation but with portions thereof in section.

Fig. 2 is a central vertical section taken on the line 2—2 of Fig. 1.

Fig. 3 is a central vertical section taken on the line 3—3 of Fig. 1.

Fig. 4 is the same as Fig. 1, showing a modification thereof.

Fig. 5 is a section taken on the line 5—5 of Fig. 4.

Fig. 6 is the same as Fig. 1, showing a further modification thereof.

In the drawings there is shown a driving member 10 and a driven member 11. The driving member comprises a shaft telescoped and rotatably supported within a tubular sleeve portion of the driven member. Rigidly keyed to the sleeve portion of the driven member there is a pair of spaced pockets 12 and 13 having internal clutch surfaces indicated at 14 and 15, respectively. Intermediate said pockets 12 and 13 there is a stationary or fixed member or support 16 having a central annular bearing 17 within which the sleeve portion of the driven member is rotatably supported. Each end portion of the stationary member is formed with oppositely and outwardly extending fixed pockets 18 and 19 for providing internal cylindrical clutch surfaces.

Mounted within the pockets 12 and 18 there is a braking element comprising a helical spring 20 with a corresponding spring 21 mounted within the pockets 13, 19. Said clutch springs are wound slightly over size to positively engage the clutch surfaces of said pockets respectively under spring tension. One end portion of the spring 20 extends in or is keyed to the pocket 12, as indicated at 22. The opposite end of the spring 20 extends downwardly to provide a projection or toe 23. Correspondingly, the spring 21 has one end anchored to the pocket 13 at 24 and the other end extends inwardly to provide a projection 25. The projections 23, 25 lie adjacent opposite sides of the central bearing portion 17 of the stationary member.

The driving shaft 10 carries a pair of energizing pins 26 and 27 extending radially therefrom and in axial alignment with each other. Said pins protrude through the elongated slots 28 respectively provided in the sleeve portion of the driven member 11. The pin 26 extends in position to engage the projection 23 of spring 20. The pin 27 extends into position to engage the projection 25 of spring 21. The outer ends of said pins are slightly spaced from the inner surface of the respective clutch springs.

The shaft 10 is provided with a driving key 29 extending into a keyway 30 provided in the sleeve portion of the driven member 11. The clearance between the key 29 and keyway 30 is less than the clearance between the energizing pins 26, 27 and their respective slots 28 so that said energizing pins have free play relative to the sleeve portion of the driven member without interfering with the driving connection afforded by the key 29 between the driving and driven members. Thus, the shaft 10 will drive the shaft 11 through the key 29 in either direction without interference between the energizing pins and the driven member.

The shaft 10 is provided with a bore 31 to receive a detent spring 32 operating upon the detent ball 33. The sleeve portion of the driven member 11 is provided with a detent seat 34 for receiving the ball 33. The bore and seat are so aligned relative to each other that the detent ball will yieldingly interlock the shafts 10 and 11 in centralized position with the key 29 centrally of the keyway 30 and the energizing pins centrally of the recesses through which they extend and in proper relation to the projections 23, 25 of the respective clutch springs. It is to be noted that the key 29 is spaced from opposite walls of the keyway a greater distance than the energizing pins are spaced from the projections of the clutch springs so that said projections will be engaged by their respective energizing pins before the driving key is brought into driving engagement with its keyway.

In operation, upon the shaft 10 being rotated clockwise, as in Fig. 2, the energizing pin 27 will first engage the projection 25 of the clutch spring 21 to wrap said spring down out of locking engagement with the pocket 19 and thereby free the spring from its normal locking engagement with the fixed member. Thereupon the driving key 29 will be moved into engagement with the sleeve portion of the driven member to transmit the driving torque thereto. Upon rotation being thereby imparted to the driven member, the pocket 12 thereof, to which one end of the clutch spring 20 is anchored, will rotate said spring in the overrunning or wrap down direction so as to free it from its frictional locking engagement with the pocket 18. Thus, both clutch springs will be overrunning to permit rotation of the driving and driven elements relative to the fixed member 16.

Upon the driving member 10 rotating in a counterclockwise direction, as in Fig. 3, the pin 26 will engage the projection 23 of spring 20 to wrap it down out of locking engagement, whereupon the driving key 29 will be moved into driving engagement with the sleeve portion of the driven member 11. The sleeve member will carry with it the pocket 13 to which one end of spring 21 is anchored at 24, thus tending to wrap down spring 21 out of locking engagement in an overrunning direction. This, of course, permits an overrun of both springs relative to the fixed element so as to permit the driving action. Upon the driving member 10 being relieved of its driving torque, the detent ball 33 will seek the pocket 34 under spring tension to center the driving and driven members in the manner above described.

In event a torque load is applied to the driven member 11, no action will result as it is at all times positively locked from rotation through its connection with both clutch springs 20 and 21. Since said springs are normally in locking engagement with the fixed element, and since any rotative force applied to the driven element 11 will be imparted to said springs through their end connections 22, 24 in a direction tending to expand one or the other, increase in torque load on the driven member will merely tend to tighten one of said springs in its locking engagement. Therefore, by means of the dual clutch springs being positively anchored to the driven member and normally in locking engagement therewith, no back lash or movement thereof will be permitted when a torque load is applied thereto. For example, upon a torque load being applied to shaft 11 in a clockwise direction (Figs. 2 and 3), spring 21 would tend to expand, and in a counterclockwise direction spring 20 would tend to expand.

In the modified form shown in Figs. 4 and 5, the driving key 29 and the pins 26, 27 above described are combined into a single energizing and driving key 127 secured to the driving member 10 in the same relative position as the energizing pins 26, 27 of Fig. 1. This energizing and driving key similarly extends through an elongated slot 128 in the sleeve portion of the driven member. Said key is free to rotate within the central portion of the fixed element 116, one of the pockets of which is indicated at 119 and the other pocket at 118.

In operation, when the driving element 10 is rotated in a clockwise direction, the key 127 first engages the projection 25 of spring 21 to release said spring, thereafter moving through the slot 128 to engage and drive the driven member 11. Upon counterclockwise rotation of the driving member, the key 127 moves into engagement with the projection 23 of spring 20 to wrap it down out of locking engagement, after which it proceeds to engage and drive the driven member 11. Thus, in all respects the key 127 comprises an energizing means acting in precisely the same manner as the energizing means consisting of pins 26 and 27 to engage the energizing end portions 23, 25 of the clutch springs. Said key 127, therefore, acts both as the energizing and the driving means.

As shown in Fig. 6, the pockets 212 and 213 are integrally formed or otherwise secured to the sleeve portion of the driven member to serve in precisely the same manner as the above described pockets 12 and 13 of Fig. 1. The fixed element in this modification includes spaced pockets 218, 219 serving in the same manner as the corresponding pockets 18, 19 of the fixed element shown in Fig. 1. The clutch springs 220 and 221 are reversed end to end from the springs 20 and 21 of Fig. 1, but otherwise similarly function to frictionally lock with their respective pockets. The adjacent ends of said springs are secured to the pockets 212 and 213 at 222 and 224, respectively, their opposed outer ends being provided with an inwardly extending projection or toe 223 and 225, respectively, for engagement by the energizing pins 26, 27, depending upon the direction in which the driving member is rotated. It will be apparent that the operation of the structure shown in Fig. 6 is in all respects the same as that shown in Fig. 1.

As indicated in Fig. 1, the clutch springs are slotted gradiently in depth from the energizing end toward the load carrying coils, as indicated at 35, in the manner and for the purpose as disclosed in my Letters Patent No. 1,953,370, granted April 3, 1934, entitled "Spring clutch." Said clutch springs or the clutch surface of the pockets may be knurled instead of being grooved, in the manner and for the purpose as disclosed in my application Serial No. 627,374, filed November 8, 1945, entitled "Spring clutch device and method of making the same." In this connection it is to be noted that this construction embodying the dual clutch springs permits of so forming said springs either by grooving or knurling as to permit their respective energizing ends to operate more efficiently and positively in their locking and releasing action while retaining the maximum surface contact with the load carrying coils. This permits the load carrying end of the clutch spring to be of greater cross section or surface area to carry the peak loads than the energizing ends of the springs, to thereby cut down the overrunning torque while overrunning in their respective pockets upon the driving torque being applied to the driving member. Also in the single spring no-back device, each end of the spring has to serve alternately as the load carrying end and the energizing end. Thus, the energizing end has to carry the peak load when rotated in one direction and still act as a flexible energizing end when rotated in the other direction. By utilizing dual springs, each may have one end particularly designed as a load carrying end and the other end particularly designed as the more sensitive energizing end.

The invention claimed is:

1. In a power transmission, the combination of driving and driven members, one of said members having opposed pockets, a fixed element having opposed pockets matching the afore-mentioned pockets, respectively, and a braking element comprising a helical spring mounted in each pair of matching pockets for locking engagement therewith, each of said springs having one end portion thereof operable by one of said members tending to exert a locking action with said pockets and the other end operable by the other of said members for causing it to release said pockets, said members being operably engageable with each other to provide an interdriving connection therebetween upon one of said clutch springs being moved out of locking engagement with one of its associated pockets.

2. In a power transmission, the combination of driving and driven members, one of said members having opposed pockets, a fixed element having opposed pockets matching the aforementioned pockets respectively, a braking element comprising a helical spring in each pair of matching pockets normally in locking engagement therewith, each of said springs having one end interlocked in its respective first-mentioned pockets, and means carried by the other of said members operable to engage the opposite end portion of one of said springs according to the direction of rotation for causing it to overrun said fixed element, said means thereafter providing a driving connection between said members.

3. In a power transmission, the combination of driving and driven members, one of said members having opposed pockets, a fixed element having opposed pockets matching the aforementioned pockets, respectively a braking element comprising a helical spring mounted in each pair of matching pockets normally in locking engagement therewith, each of said springs having one end interlocked with said driven member, and means carried by said driving member operable to engage the opposite end portion of one of said springs according to the direction of rotation for causing it to release said fixed element, said means thereafter providing a driving connection between said members.

4. In a power transmission, the combination of driving and driven members, one of said members having opposed pockets, a fixed element having opposed pockets matching the aforementioned pockets, respectively a braking element comprising a helical spring mounted in each pair of matching pockets normally in locking engagement therewith, each of said springs having one end interlocked with said driven member, and a projection carried by said driving member operable to engage the opposite end portions of one of said springs according to the direction of rotation for causing it to release said fixed element, said projection thereafter engaging said driven member for providing a driving connection between said members.

5. In a power transmission, the combination of driving and driven members, one of said members having opposed pockets, a fixed element having opposed pockets matching the aforementioned pockets, respectively a braking element comprising a helical spring mounted in each pair of matching pockets normally in locking engagement therewith, each of said springs having one end interlocked with said driven member, a pair of aligned energizing pins carried by said driving member, one of said pins being positioned to engage the free end portion of one of said clutch springs and the other pin being positioned to engage the free end portion of the other of said springs according to the direction of rotation of said driving member for causing the engaged spring to release said fixed element, and a lost motion driving connection between said members operable upon said engaged clutch spring being moved out of locking engagement.

6. In a power transmission, the combination of driving and driven members, one of said members having opposed pockets, a fixed element having opposed pockets matching the aforementioned pockets, respectively a braking element comprising a helical spring mounted in each pair of matching pockets normally in locking engagement therewith, each of said springs having one end interlocked with said driven member, and an elongated key extending radially from said driving member for engagement with the free end of one of said springs when rotated in one direction and engagement with the other of said springs when rotated in the opposite direction for causing the engaged spring to release said fixed element, said key being thereafter engageable with said driven member for driving said member upon continued rotation thereof.

7. In a power transmission, the combination of driving and driven members, one of said members having opposed pockets, a fixed element having opposed pockets matching the aforementioned pockets, respectively a braking element comprising a helical spring mounted in each pair of matching pockets normally in locking engagement therewith, each of said springs having one end interlocked with said driven member, means carried by said driving member operable to engage the opposite end portion of one of said springs according to the direction of rotation for causing it to release said fixed element, said means thereafter providing a driving connection between said members, and yielding means interengageable between said members for centering them in non-driving relation.

8. In a power transmission, the combination of driving and driven members, one of said members having opposed clutch surfaces, a fixed element having opposed clutch surfaces matching the aforementioned surfaces respectively, a braking element comprising a helical spring mounted for engagement with each pair of matching clutch surfaces and normally in locking engagement therewith, each of said springs having one end portion interlocked with one of said members and the other end portion thereof extending freely and radially of said clutch surfaces, and means projecting radially from the other of said members operable to be rotated thereby into engagement with the free end portion of one of said springs according to the direction of rotation for causing it to release said fixed element, said means thereafter engaging and driving the other of said members upon continued rotation.

9. In a power transmission, the combination of driving and driven members, one of said members having opposed clutch surfaces, a fixed element having opposed clutch surfaces matching the aforementioned surfaces respectively, a braking element comprising a helical spring mounted for engagement with each pair of matching clutch surfaces and normally in locking engagement therewith, each of said springs having one end portion interlocked with one of said members and the other end portion thereof extending freely and radially of said clutch surfaces, means projecting radially from the other of said members operable to be rotated thereby into engagement with the free end portion of one of said springs according to the direction of rotation for causing it to release said fixed element, said means thereafter engaging and driving the other of said members upon continued rotation, and a spring pressed interlocking element for releasably interconnecting and centering said members relative to each other in inoperative position.

10. In a power transmission, the combination of driving and driven members, one of said members having opposed pockets, a fixed element having opposed pockets matching the aforementioned pockets respectively, a braking element comprising a helical spring mounted in each pair of matching pockets normally in locking engagement therewith, each of said springs having one end interlocked with said driven member and the opposite free end thereof extending radially inward from said fixed element, energizing pins carried by said driving member so related to the inwardly extending free ends of said springs as to engage one of said springs to release it when said driving member is rotated in one direction, and engage the other of said springs to release it when said driving member is rotated in the opposite direction, and a driving key carried by one of said members engageable with the other member for providing a driving connection therebetween following the release of said springs.

11. In a power transmission, the combination of driving and driven members, said driven member being provided with a sleeve portion for rotatably receiving said driving member therein, said sleeve portion being slotted and provided with a pair of opposed pockets, a fixed element in which said members are rotatably mounted having opposed pockets matching the aforementioned pockets, a braking element comprising a helical spring mounted in each pair of matching pockets normally in locking engagement therewith, each of said springs having one end interlocked in their respective pockets, the opposite end portions of said springs being free and each provided with an inwardly extending projection, and means carried by said driving member extending through said slot into position to engage one of said projections upon rotation of said member in one direction and the other of said projections upon rotation in the opposite direction for releasing the engaged spring and permit relative rotation between said driven member and fixed element.

12. In a power transmission, the combination of driving and driven members, said driven member being provided with a sleeve portion for rotatably receiving said driven member therein, said sleeve portion being slotted and provided with a pair of opposed pockets, a fixed element in which said members are rotatably mounted having opposed pockets matching the aforementioned pockets, a braking element comprising a helical spring mounted in each pair of matching pockets normally in locking engagement therewith, each of said springs having one end interlocked in its respective clutch pocket, the opposite end portion of each said spring being free and provided with an inwardly extending projection, and means carried by said driving member extending through said slot into position to engage one of said projections upon rotation of said member in one direction and the other of said projections upon rotation in the opposite direction for releasing the engaged spring and permit relative rotation between said driven member and fixed element, said spring engaging means being thereafter engageable with the sleeve portion of said driven member to provide a direct drive between said members.

13. In a power transmission, the combination of driving and driven members, said driven member being provided with a sleeve portion for rotatably receiving said driven member therein, said sleeve portion being slotted and provided with a pair of opposed pockets, a fixed element in which said members are rotatably mounted having opposed pockets matching the aforementioned pockets, a braking element comprising a helical spring mounted in each pair of matching pockets normally in locking engagement therewith, each of said springs having one end interlocked in its respective clutch pocket, the opposite end portion of each said spring being free and provided with an inwardly extending projection, a pair of spaced pins carried by said driving member and projecting radially through the slotted sleeve portion of said driven member engageable with said projections respectively according to the direction of rotation of said driving member to cause the engaged spring to release said fixed element, and a driving key carried by one of said members engageable with the other of said members upon relative rotation for thereafter providing a direct drive between said members.

14. In a power transmission, the combination of driving and driven members, said driven member being provided with a sleeve portion for rotatably receiving said driven member therein, said sleeve portion being slotted and provided with a pair of opposed pockets, a fixed element in which said members are rotatably mounted having opposed pockets matching the aforementioned pockets, a braking element comprising a helical spring mounted in each pair of mating pockets normally in locking engagement therewith, each of said springs having one end interlocked in its respective pocket, the opposite end portion of each said spring being free and provided with an inwardly extending projection, a pair of spaced pins carried by said driving member and projecting radially through the slotted sleeve portion of said driven member engageable with said projections respectively according to the direction of rotation of said driving member to cause the engaged spring to release said fixed element, a driving key carried by one of said members thereafter engageable with the other of said members for providing a direct drive therebetween, and a spring pressed detent carried by one of said members engageable with a centering seat provided in the other of said members for centering said pins and key in their inoperative positions.

15. In a power transmission, the combination of means providing a fixed clutch surface, a driving and a driven member, a pair of braking element comprising a helical spring both normally in locking engagement with said surface, one end of each spring secured to the driven member and the opposite end of each spring being free and located on opposite sides of a plane extending radially of the driving shaft, and energizing means on said driving shaft extending in said plane for engaging the free end of one of the springs to release it from said surface when turning in one direction and when turning in the opposite direction to engage the free end of the other spring to release it from said clutch surface.

WILLIAM CARLETON STARKEY.

REFERENCES CITED

The following references are of record in the file of this patent:

UNITED STATES PATENTS

| Number | Name | Date |
|---|---|---|
| 1,867,643 | Ackerman et al. | July 19, 1932 |
| 1,997,646 | Miller | Apr. 16, 1935 |
| 2,372,693 | Swift | Apr. 3, 1945 |